Jan. 22, 1929.
W. R. COCKBURN
1,700,025
MILKING MACHINE TEAT CUP
Filed June 18, 1926
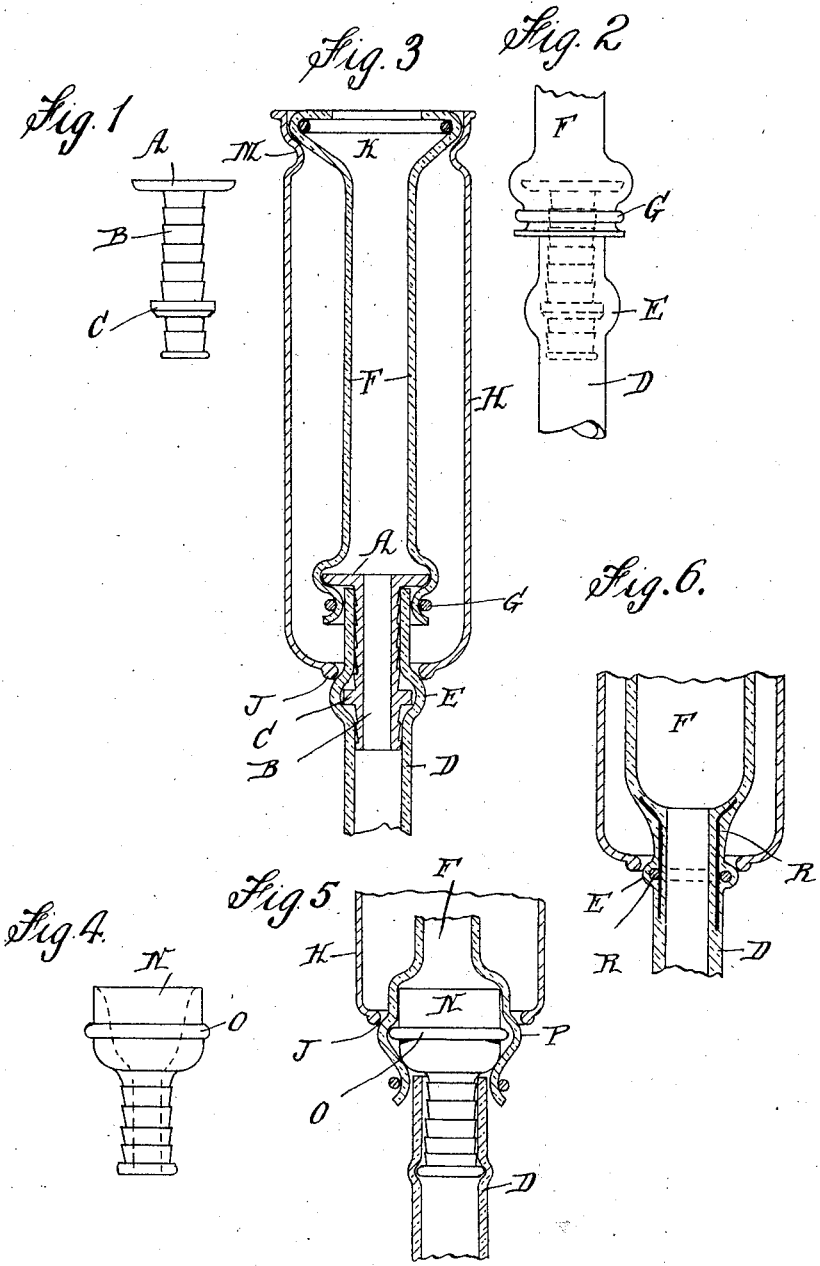
W. R. Cockburn
inventor
By: Marks & Clark
Attys Patented Jan. 22, 1929.

1,700,025

UNITED STATES PATENT OFFICE.

WILLIAM REGINALD COCKBURN, OF OTAHUHU, NEW ZEALAND, ASSIGNOR OF ONE-HALF TO ALBERT HICKTON O'LEARY, OF AUCKLAND, NEW ZEALAND.

MILKING-MACHINE TEAT CUP.

Application filed June 18, 1926, Serial No. 116,951, and in New Zealand July 4, 1925.

This invention relates to milking machine teat cups of the well known type formed by an outer rigid casing and an inner flexible lining, generally called an inflation, that is secured at its top and bottom ends to the respective top and bottom ends of the casing, so that the said inflation may expand and contract on to the teat in the well known manner.

The invention has been devised with the object of providing improved means for straining the said inflation to its necessary tension and for securing the bottom end thereof, and which means are designed to work in conjunction with any of the known and approved methods adopted for securing the upper end of the inflation.

The means comprised in the present invention allow for the quick assembly of the cup parts in the milking condition, and for the easy dis-assembly for cleansing purposes, and at the same time provide for a secure and airtight joint for the bottom fastening.

These means are designed to be used in combination with a cup casing having a round aperture in its bottom end and to effect the fastening by forming a tubular extension of the inflation, or a tubular fitting to which it is attached in a manner to cover it with rubber, with an enlarged diameter at a point in its height so that a rubber or rubber covered bulge is formed, that is adapted to be passed down through the aperture in the casing bottom and the bulge to be forced through such aperture. This bulge then engages the outside bottom edge of the aperture and is kept from passing back by such engagement, which is made hermetically tight by the tension on the inflation.

The invention may be adapted to the present well known form of fastening embodying a milk nipple fitting, consisting in a tubular stem having an enlarged head around which the bottom end of the inflation is secured, and which stem is passed down through the casing aperture, by forming such stem with the enlargement upon it and by passing the usual claw rubber connection tube up over this enlargement. It may also be adapted to the well known form of fastening in which the tubular fitting is made as a plug at its upper end, designed to have the inflation end stretched over it and to fit into the aperture by forming the enlargement upon the plug surface. If desired also it may be adapted to an inflation and claw rubber connection made in one, by forming the claw rubber with a re-inforced enlargement at a suitable point in its length.

These ways of giving effect to the invention are illustrated in the accompanying drawings, in which:—

Figure 1 is an elevation of a nipple of the first mentioned type as constructed in accordance with this invention.

Figure 2 is an elevation of the lower end of the inflation and the claw rubber in assembled position upon the nipple.

Figure 3 is a sectional elevation of a complete teat cup having the inflation secured in the manner herein provided for.

Figure 4 is a view of the plug form or type of nipple.

Figure 5 is a view of this plug form of nipple in position in the cup.

Figure 6 is an illustration of the form of the invention in which the inflation and claw tube are made in a single combination.

Referring first to Figures 1 to 3, the nipple fitting shown is made in the usual style with the enlarged head A at its upper end and with the tubular stem B which has its outer surface stepped or roughened to provide a grip for the claw tube. In this invention the stem B is made with a collar enlargement C positioned at a suitable point in its length so that when the claw tube D is pushed up over the stem a bulge E, as in Figures 2 and 3, is formed in its diameter.

The teat cup inflation F has its lower end secured around the upper end of the nipple fitting in the well known way by stretching such end over the nipple head A and then encircling the end by a ring G that is large enough to be passed over the collar C.

In assembling the inflation and claw rubber ready for insertion in the cup casing H, the claw rubber is pushed right up the stem B so that its end engages the lower side of the nipple head A with the inflation and ring G surrounding it, as shown in Figure 2. The claw rubber and inflation are then passed down into the open top of the casing so that the claw rubber passes out through the circular opening J in the bottom thereof. The top of the inflation then being sealed to the top end of the casing in any approved manner, the inflation may be stretched and its bottom held by forcing the bulge E through the opening J by pulling on the bottom end of the claw rubber. The opening J is made of the necessary diameter relative to the diameter of the collar C and the thickness of the claw rubber, to permit of the bulge being worked through the opening and then for it to engage the lower edge thereof and by the resiliency of the stretched inflation rubber, to be drawn up closely to make an airtight seal with such edge and at the same time to hold the inflation securely.

The manner of holding the top end of the inflation shown in Figure 3, consists in stretching it out around a ring K to form a shoulder and then causing such shoulder to engage and rest upon a flange M formed around the inside of the casing top, in a well known way. Other known ways of securing the top end of the inflation to the casing top to permit of its lower end being drawn down may, however, be employed.

In the form of the invention shown in Figures 4 and 5 the inflation bottom is stretched out around a plug nipple fitting N and such plug is drawn into the bottom opening of the casing. The outside periphery of the plug is formed with the collar enlargement O upon it so that the stretching of the inflation over it forms the bulge P. The plug nipple is in this case drawn down through the casing bottom and the bulge worked through the opening J thereof so that it engages the lower edge of the opening and secures the inflation with an airtight joint similarly to the example shown in Figure 3.

In the form of securing the lower end of the inflation shown in Figure 6, the inflation and claw rubber are made in one and a nipple fitting dispensed with. In this case the claw rubber portion D, at a suitable point below its connection with the inflation, is made with a bulge E in its outer peripheral diameter so that the locking and sealing effect explained in connection with the form shown in Figure 3, may be similarly obtained. If required the rubber at this point, and its bulge enlargement, may be re-inforced by suitably shaped rigid re-inforcements R embedded in the rubber in the course of moulding the complete article.

I claim:—

1. In milking machine teat cups, in combination, a claw connecting tube, an inflation tube, a casing formed with an internal shoulder at its upper end, the upper end of the inflation tube being adapted to rest on said shoulder, said casing having an aperture at its lower end and a nipple fitting constructed to receive the lower end of the inflation tube on its upper part and the end of the claw tube on its lower part and to hold said tubes in fixed relationship to each other so that they may be passed down through the upper end of the casing to cause the claw tube to extend through the said aperture in the casing bottom, and also formed with an enlargement in its external diameter, said enlargement being covered by one of said tubes to form a bulge of larger size than the said aperture but capable of being forced through it, substantially as specified.

2. In milking machine teat cups, the combination of a casing having an internal shoulder at its upper end and an aperture in its bottom end, an inflation tube having means fitted in its upper end to engage and rest upon the said shoulder, a claw rubber connection, a nipple fitting having means at its upper end to secure the lower end of the inflation tube thereto, the lower end of said nipple being covered by the said claw tube, said lower end being formed with an external enlargement of its diameter so that when said enlargement is covered by the claw rubber a bulge is formed in the diameter, said bulge being normally too large to pass through the said aperture in the casing bottom, except by force or pressure exerted thereon, substantially as specified.

In testimony whereof, I affix my signature.

WILLIAM REGINALD COCKBURN.